(12) United States Patent
Kim et al.

(10) Patent No.: US 7,102,705 B2
(45) Date of Patent: Sep. 5, 2006

(54) BACKLIGHT ASSEMBLY AND LIQUID CRYSTAL DISPLAY DEVICE HAVING THE SAME

(75) Inventors: Heu-Gon Kim, Suwon-si (KR); Kyu-Seok Kim, Yongin-si (KR); Jae-Ho Jung, Yongin-si (KR); Jong-Dae Park, Seoul (KR); Jeong-Hwan Lee, Suwon-si (KR); Dong-Hoon Kim, Suwon-si (KR)

(73) Assignee: Samsung Electronics Co., Ltd., (KR)

( * ) Notice: Subject to any disclaimer, the term of this patent is extended or adjusted under 35 U.S.C. 154(b) by 76 days.

(21) Appl. No.: 10/871,653

(22) Filed: Jun. 17, 2004

(65) Prior Publication Data
US 2005/0068473 A1 Mar. 31, 2005

(30) Foreign Application Priority Data
Sep. 26, 2003 (KR) ............... 10-2003-0066759
Sep. 26, 2003 (KR) ............... 10-2003-0066761

(51) Int. Cl.
*G02F 1/1335* (2006.01)
(52) U.S. Cl. .......................... 349/65; 362/30
(58) Field of Classification Search ............. 349/58, 349/65; 362/30
See application file for complete search history.

(56) References Cited

U.S. PATENT DOCUMENTS

| | | | | |
|---|---|---|---|---|
| 5,729,310 | A | * | 3/1998 | Horiuchi et al. ............. 349/58 |
| 6,497,492 | B1 | * | 12/2002 | Benoit et al. ................ 349/65 |
| 2004/0189891 | A1 | * | 9/2004 | Hayashimoto et al. ....... 349/58 |

* cited by examiner

*Primary Examiner*—James A. Dudek
(74) *Attorney, Agent, or Firm*—Cantor Colburn LLP

(57) ABSTRACT

A backlight assembly includes a light guide plate including a light incident face, a light exiting face extended from one end portion of the light incident face, and a reflection face extended from another end portion of the light incident face. The reflection face includes a first reflection face extended from another end portion of the light incident face, and a second reflection face horizontally extended from the first reflection face. The backlight assembly additionally includes a light adsorption member disposed adjacent to the reflection face to prevent the light from reflecting. A reflection plate and optical sheets are disposed adjacent to the light guide plate, so that entire thickness of the backlight assembly is reduced. In addition, leakage of the light incident around the third light exiting face is prevented to improve the quality of the image displayed through the LCD device.

34 Claims, 17 Drawing Sheets

BACKLIGHT ASSEMBLY AND LIQUID CRYSTAL DISPLAY DEVICE HAVING THE SAME

CROSS REFERENCE TO RELATED APPLICATIONS

This application claims priorities under 35 USC § 119 to Korean Patent Application No. 2003-66759 filed on Sep. 26, 2003 and Korean Patent Application No. 2003-66761 filed on Sep. 26, 2003, the contents of which are herein incorporated by reference in their entireties for all purposes.

BACKGROUND OF THE INVENTION

1. Field of the Invention

The present invention relates to a backlight assembly and a liquid crystal display device having the backlight assembly. More particularly, the present invention relates to a backlight assembly having a thin thickness and achieving an improved image quality, and a liquid crystal display device having the backlight assembly.

2. Description of the Related Art

Generally, liquid crystal display (LCD) devices correspond to flat panel display devices that display an image using liquid crystal (LC) installed therein. The LCD device includes a liquid crystal display panel for displaying the image, and a backlight assembly disposed behind the liquid crystal display panel for providing a light to the liquid crystal display panel.

In general, the backlight assembly may determine a weight, a volume and a power consumption of the LCD device. Particularly, the LCD device applied to electronic apparatus such as a cellular phone or a notebook computer is in demand to have a thin thickness, a lightweight and low power consumption. Thus, the backlight assembly has been developed to meet above demands of the LCD device. For example, Korean Patent Laid-Open Publication No. 2003-80825 discloses the back light assembly.

FIG. 1 is a cross-sectional view illustrating a conventional backlight assembly.

Referring to FIG. 1, the conventional backlight assembly 50 includes a light source 10 for generating a light and a light guiding plate 20 for guiding the light in a predetermined direction.

The light source 10 has at least one light emitting diode (LED) so that the backlight assembly 50 has a lightweight and low power consumption.

The light guiding plate 20 includes a light incident face 21, a reflection face 22 and a light exiting face 23. The light generated from the light source 10 is irradiated into the light incident face 21. The reflection face 22 is extended from one end portion of the light incident face 21, and the light exiting face 23 is enlarged from another end portion opposing the light exiting face 23 of the light incident face 21. The light incident into the light incident face 21 is emitted through the light exiting face 23. Here, the light guiding plate 20 has a flat shape in which the light exiting face 23 is substantially parallel to the reflection face 22. In addition, a height h of the light incident face 21 is substantially identical to a distance d between the reflection face 22 and the light exiting face 23.

The backlight assembly 50 further includes a plurality of optical sheets 30 disposed over the light exiting face 23 to improve characteristics of the light emitted through the light exiting face 23. A reflection plate 40 is additionally disposed under the reflection face 22 to reflect a light leaked from the light guiding plate 20 toward the light guiding plate 20, thereby increasing an efficiency of the backlight assembly 50.

In the conventional backlight assembly 50, a size of the light source 10 may determine the height h of the light incident face 21 and the distance d between the reflection face 22 and the light exiting face 23. As the size of the light source 10 increases, the height h and the distance d also increase. Additionally, an increase of the size of the light source 10 augments an entire thickness t of the backlight assembly 50 including the optical sheets 30 and the reflection plate 40. On the other hand, when the size of the light source 10 is reduced, the entire thickness t of the backlight assembly 50 is also decreased.

However, the reduction of the entire thickness t of the backlight assembly 50 may be limited in accordance with the size reduction of the light source 10. In addition, since the backlight assembly 50 includes the optical sheets 30 and the reflection plate 40, the entire thickness t of the backlight assembly 50 may not be further reduced.

SUMMARY OF THE INVENTION

The present invention provides a backlight assembly having a thin thickness and achieving an improved image quality.

The present invention also provides a liquid crystal display device including the backlight assembly.

In accordance with one aspect of the present invention, a backlight assembly includes a light source generating a light, a light guiding plate guiding the light in a predetermined direction, a receiving container receiving the light source and the light guiding plate therein, and a reflection plate disposed between the reflection face and the receiving container to reflect a light leaked from the reflection face. The light guiding plate includes a light incident face where the light generated from the light source is incident, a light exiting face extended from a first end portion of the light incident face, and a reflection face extended from a second end portion of the light incident face. Here, the reflection face includes a first reflection face extended from the second end portion of the light incident face by a predetermined angle, and a second reflection face extended from the first reflection face in a horizontal direction respect to the light incident face.

In accordance with another aspect of the present invention, a backlight assembly includes a light source generating a light, a light guiding plate, a receiving container receiving the light source and the light guiding plate therein, and a light absorption member disposed between the reflection face and the receiving container to correspond to the reflection face so that the light absorption member prevents a reflection of a light leaked from the reflection face. The light guiding plate includes a light incident face where the light generated from the light source is incident, a light exiting face having a guiding portion extended from a first end portion of the light incident face and a first light exiting face extended from the guiding portion in a horizontal direction relative to the light incident face, and a reflection face extended from a second end portion of the light incident face. Here, the guiding portion includes a second light exiting face extended from the first end portion of the light incident face in a horizontal direction relative to the light incident face, and a third light exiting face extended from the second light exiting face to the first light exiting face by a predetermined angle.

In accordance still another aspect of the present invention, a liquid crystal display device includes a light source generating a light, a light guiding plate, a receiving container receiving the light source and the light guiding plate, a light absorption member, and a liquid crystal display panel. The light guiding plate includes a light incident face where the light generated from the light source is incident, a light exiting face having a guiding portion extended from a first end portion of the light incident face and a first light exiting face extended from the guiding portion in a horizontal direction relative to the light incident face, and a reflection face extended from a second end portion of the light incident face. The light absorption member is disposed between the reflection face and the receiving container to correspond to the reflection face. Here, the light absorption member prevents a reflection of a light from the reflection face. The liquid crystal display panel is disposed over the light exiting face to display an image using a light exiting from the light exiting face.

According to the backlight assembly of the present invention, a light guiding plate of the backlight assembly includes a reflection face and a light exiting face. The reflection face of the light guiding plate includes a first reflection face inclined by a predetermined angle, and the light exiting face includes a third light exiting face inclined by a predetermined angle. A reflection plate and a plurality of optical sheets are disposed in spaces provided by the inclined first reflection face and the third light exiting face, respectively. Thus, an entire thickness of the backlight assembly is reduced by a thickness of the reflection plate and a thickness of the optical sheets. In addition, a leakage of the light incident around the third light exiting face is prevented because a light adsorption member for preventing the light from reflecting is disposed near the reflection face of the light guiding plate, thereby enhancing image display quality.

BRIEF DESCRIPTION OF THE DRAWINGS

The above and other features and advantages of the present invention will become readily apparent by reference to the following detailed description when considered in conjunction with the accompanying drawings wherein.

DETAILED DESCRIPTION OF THE PREFERRED EMBODIMENTS

Figure 1:
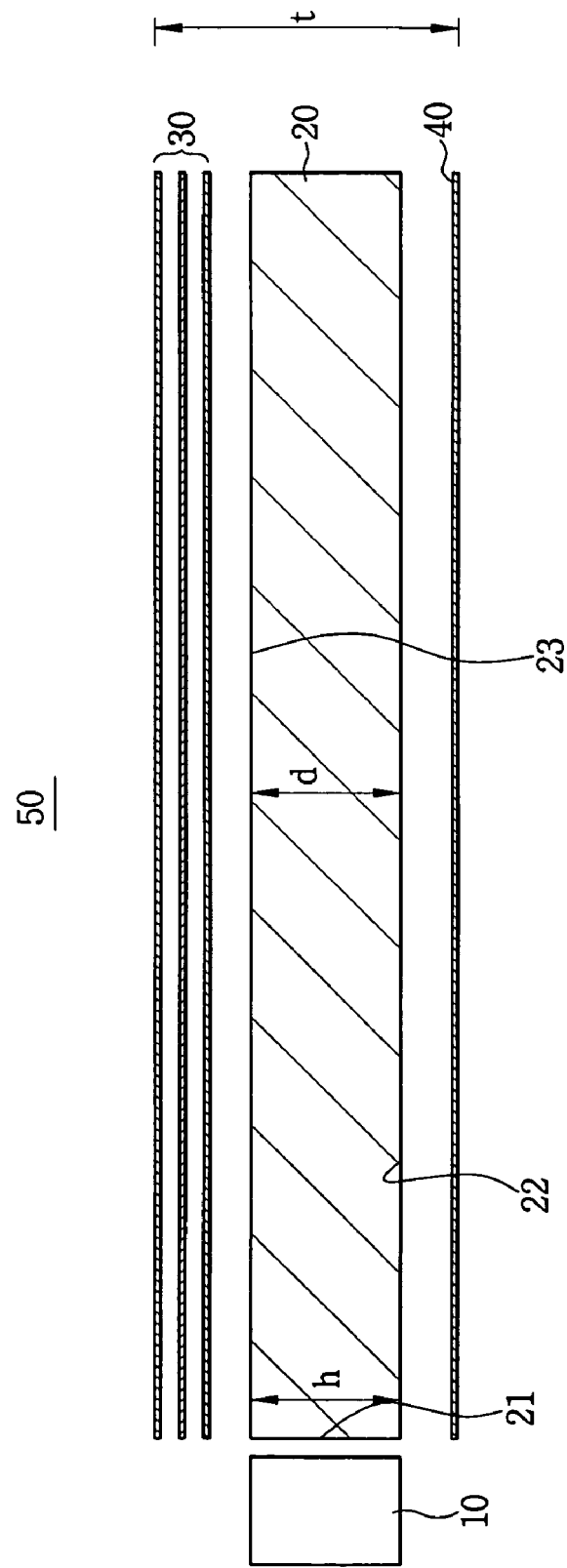
FIG. 1 is a cross-sectional view illustrating a conventional backlight assembly.

It should be understood that the exemplary embodiments of the present invention described below may be varied modified in many different ways without departing from the inventive principles disclosed herein, and the scope of the present invention is therefore not limited to these particular following embodiments. Rather, these embodiments are provided so that this disclosure will be thorough and complete, and will fully convey the concept of the invention to those skilled in the art by way of example and not of limitation.

Hereinafter the preferred embodiments of the present invention will be explained with reference to the accompanying drawings. In the following drawings, like reference numerals identify similar or identical elements.

Backlight Assembly

Figure 2:
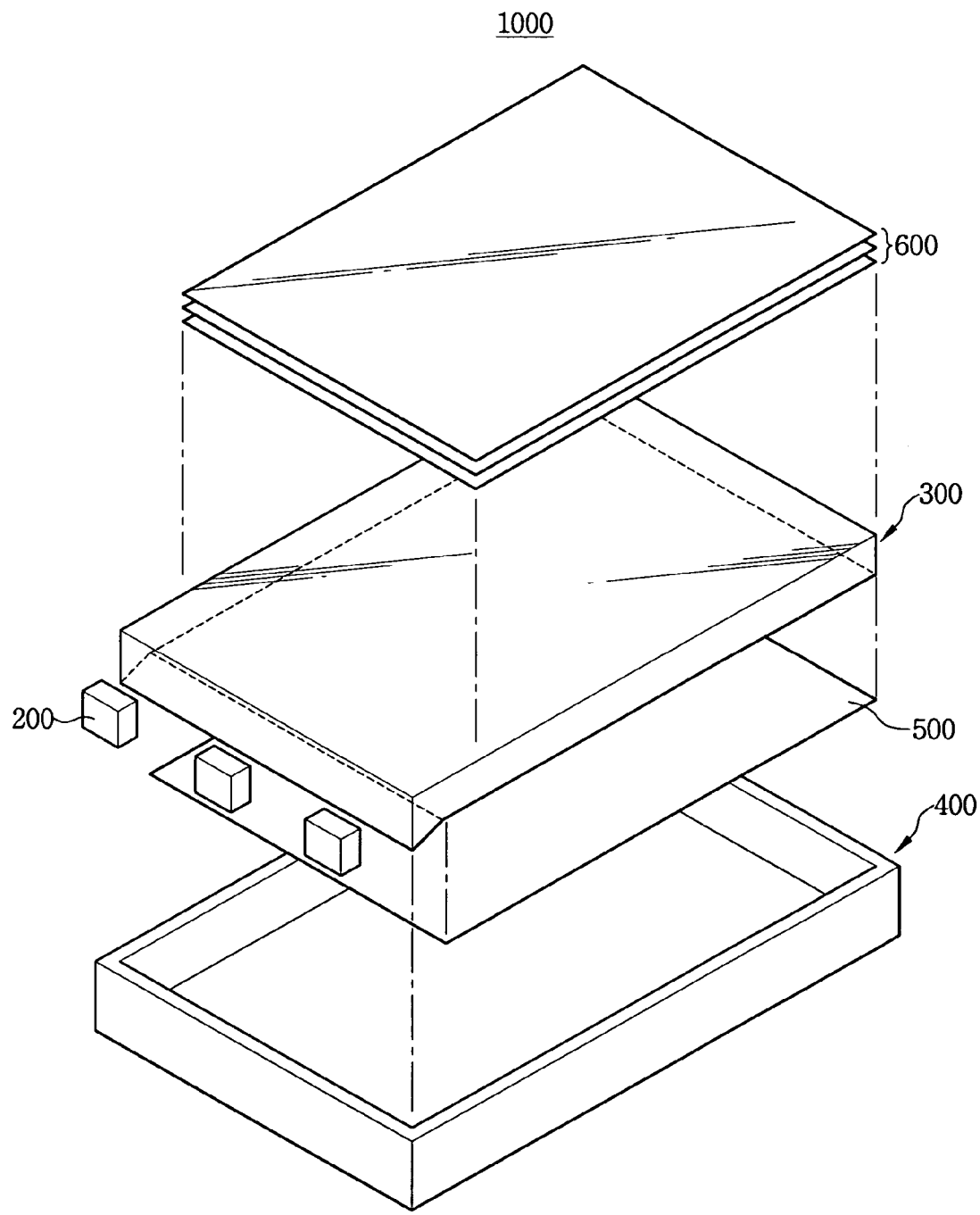
FIG. 2 is an exploded perspective view illustrating a backlight assembly in accordance with one embodiment of the present invention.
Figure 3:
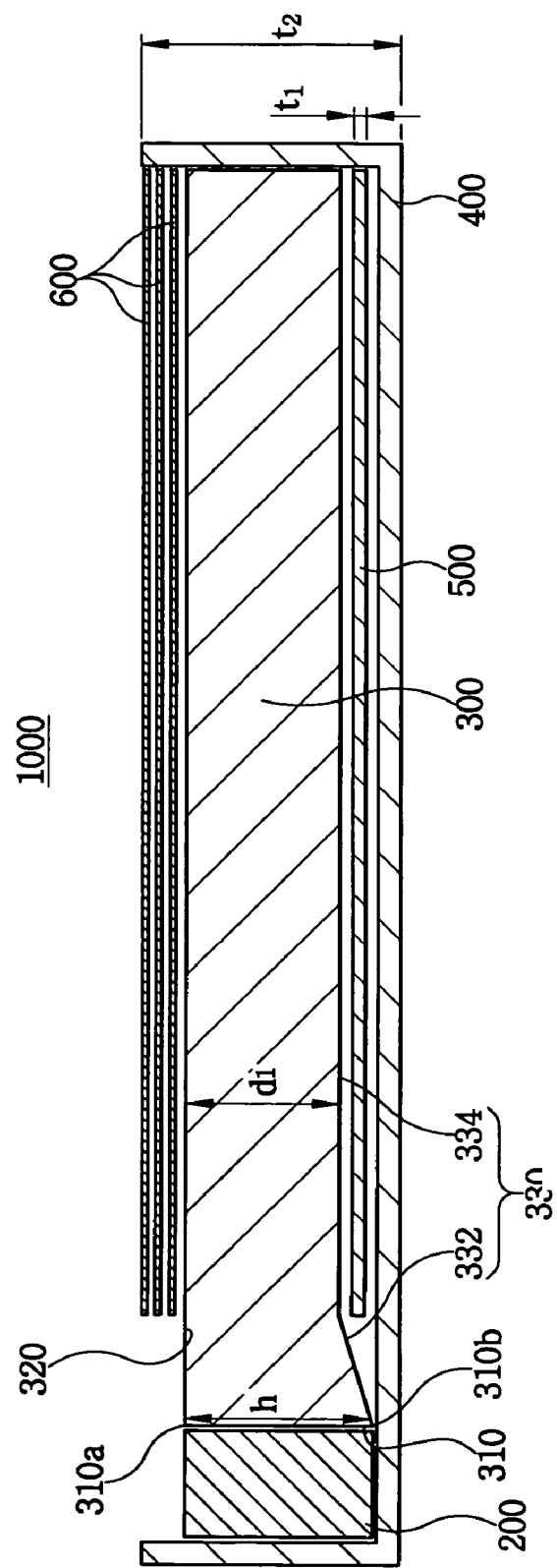
FIG. 3 is a cross-sectional view illustrating the backlight assembly in FIG. 2.

FIG. 2 is an exploded perspective view illustrating a backlight assembly in accordance with one embodiment of the present invention, and FIG. 3 is a cross-sectional view illustrating the backlight assembly in FIG. 2.

Referring to FIGS. 2 and 3, a backlight assembly 1000 of this embodiment includes a light source 200 for generating a light, a light guiding plate 300 for guiding the light in a predetermined direction, a receiving container 400 for receiving the light source 200 and the light guiding plate 300, and a reflection plate 500 for reflecting a light leaked from the light guiding plate 300.

Particularly, the light source 200 includes a plurality of light emitting diodes (LED) as a dot light source. The light source 200 for generating the light is disposed adjacent to one end portion of the light guiding plate 300.

The light guiding plate 300 includes a light incident face 310, a light exiting face 320 and a reflection face 330. The light generated from the light source 200 is incident into the light incident face 310. The light exiting face 320 is horizontally extended from a first end portion 310a of the light incident face 310. The reflection face 330 is extended from a second end portion 310b of the light incident face 310. The reflection face 330 is partially inclined relative to the light incident face 310.

The reflection face 330 includes a first reflection face 332 and a second reflection face 334. The first reflection face 332 is inclined relative to the second end portion 310b of the light incident face 310 by a predetermined angle. The second reflection face 334 is horizontally extended relative to the light incident face 310. The first reflection face 332 is extended from the second end portion 310b of the light incident face 310 and is inclined toward the light exiting face 320. Here, an angle between the light incident face 310 and the first reflection face 332 is in a range of about 0 to about 90°. Hence, a height h of the light incident face 310, which is a thickness of the light incident face 310 or a distance between the first end portion 310a and the second end portion 310b, is greater than a distance d1 between the light exiting face 320 and the second reflection face 334. The height h of the light incident face 310 is determined in accordance with a size of the light source 200. When the height h of the light incident face 310 is substantially identical to the size of the light source 200, the efficiency of the light generated from the light source 200 may be improved.

The reflection plate 500 is disposed between the reflection face 330 of the light guiding plate 300 and the receiving container 400 so that the reflection plate 500 reflects the light leaked from the reflection face 330 toward the light guiding plate 300. The reflection plate 500 has a thickness t1 substantially equal to or smaller than a distance between the second end portion 310b of the light incident face 310 and the second reflection face 334. Thus, the reflection plate 500 is inserted between the second reflection face 334 and the receiving container 400. Additionally, the reflection plate 500 has a size substantially identical to that of the second reflection face 334. Since the reflection plate 500 is installed between the second reflection face 334 and the receiving container 400, an entire thickness t2 of the backlight assembly 1000 is reduced by the thickness t1 of the reflection plate 500.

The backlight assembly 1000 further includes a plurality of optical sheets 600 disposed over the light exiting face 320 of the light guiding plate 300. The optical sheets 600 improve characteristics of the light emitted through the light exiting face 320 so that the optical sheets 600 enhance a brightness of the light and a viewing angle of an image. The optical sheets 600 include at least one light-collecting sheet for collecting the light emitted from the light exiting face 320. Alternatively, the optical sheets 600 include at least one light-diffusing sheet for diffusing the light emitted from the light exiting face 320.

Figure 4:
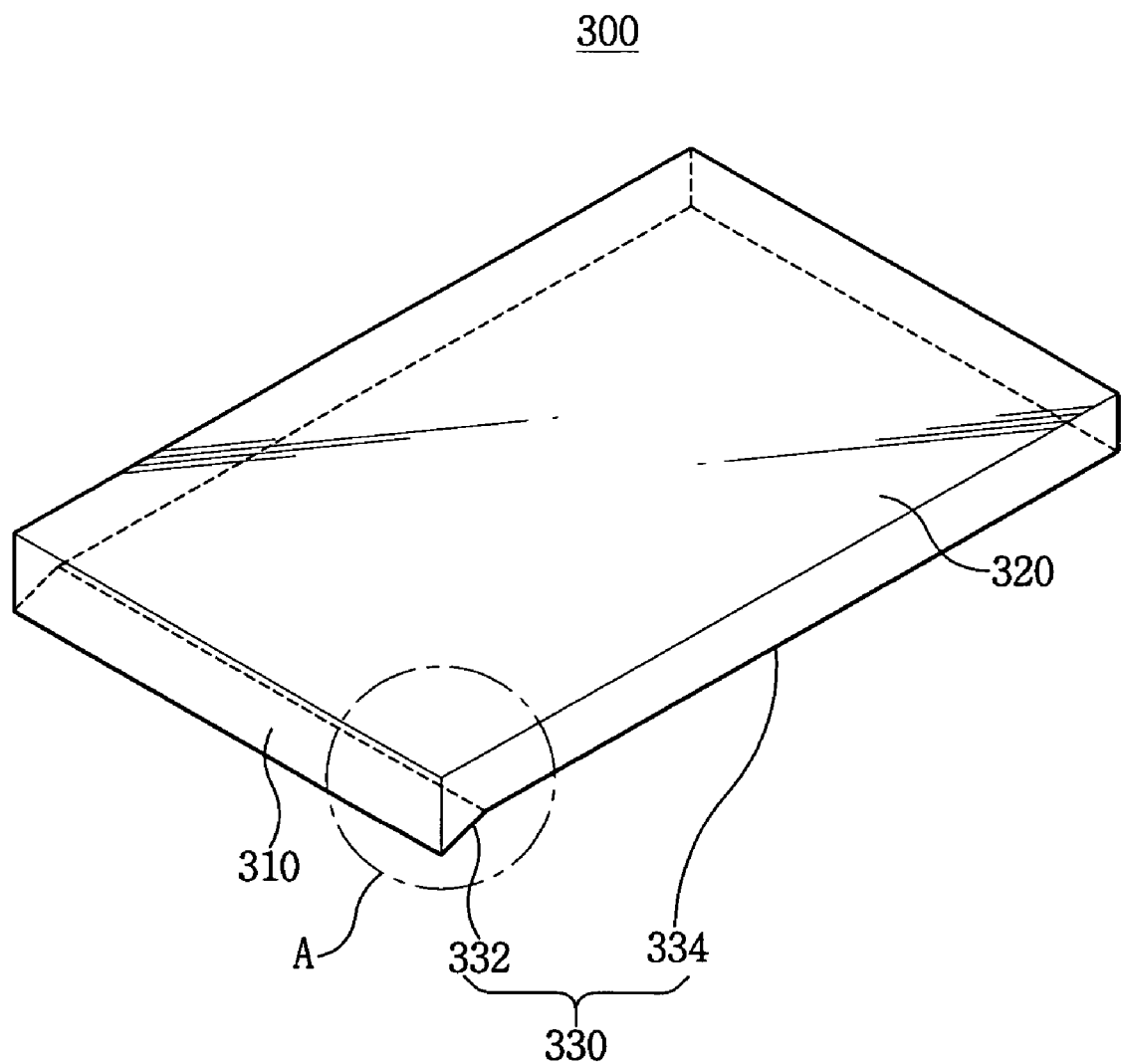
FIG. 4 is a perspective view illustrating the light guiding plate in FIG. 2.
Figure 5:
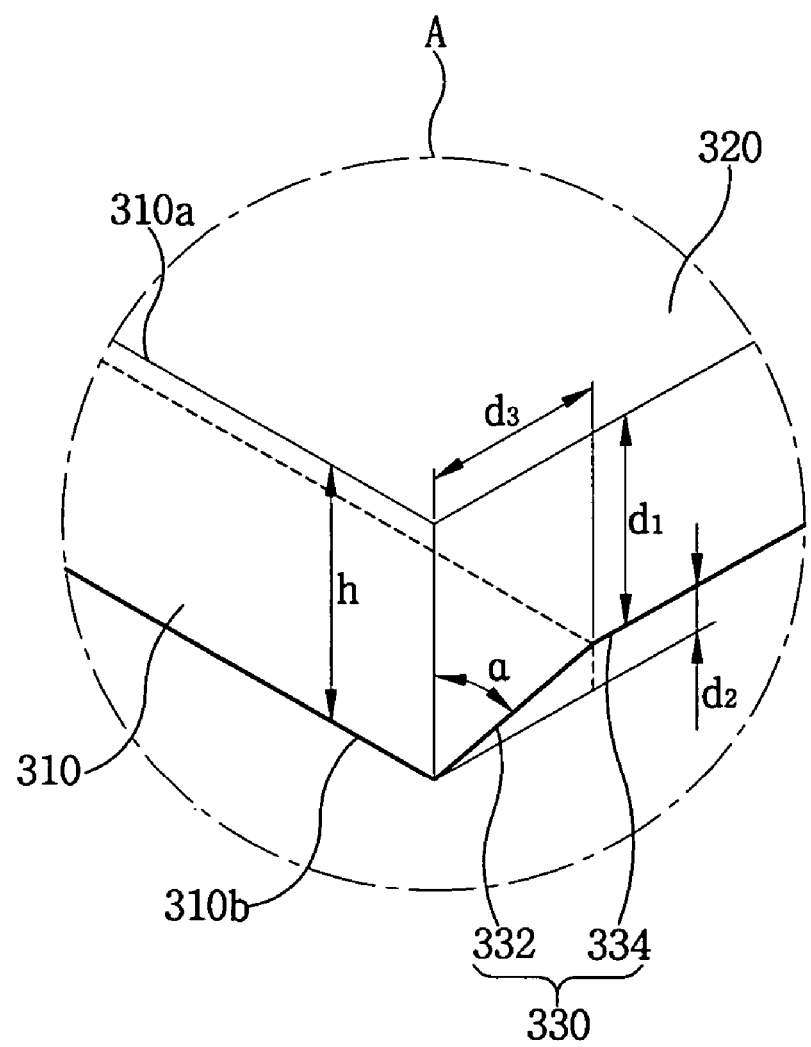
FIG. 5 is an enlarged perspective view illustrating a portion 'A' in FIG. 4.

FIG. 4 is a perspective view illustrating the light guiding plate in FIG. 2, and FIG. 5 is an enlarged perspective view illustrating a portion 'A' in FIG. 4.

Referring to FIGS. 4 and 5, the light guiding plate 300 includes the light incident face 310 having the predetermined height h, the light exiting face 320 horizontally extended from the first end portion 310a of the light incident face 310, and a reflection face 330 extended from the second end portion 310b of the light incident face 310. The light generated from the light source 200 is incident into the light incident face 310 and depart through the light exiting face 320. The reflection face 330 includes the first reflection face 332 slantingly extended from the second end portion 310b of the light incident face 310 by a predetermined angle α, and the second reflection face 334 horizontally extended from the first reflection face 332 relative to the light exiting face 320.

Particularly, the first reflection face 332 is extended from the second end portion 310b of the light incident face 310 by a predetermined extended length d3 and is inclined relative to the second end portion 310b by the predetermined angle α. Here, an angle α between the light incident face 310 and the first reflection face 332 is in a range of about 0 to about 90°. Preferably, the first reflection face 332 is inclined relative to the light incident face 310 to meet a total reflection condition in which the light incident through the light incident face 310 is entirely reflected from the first reflection face 332 without any transmission of the light through the first reflection face 332.

In one embodiment of the present invention, the extended length d3 of the first reflection face 332 may vary in accordance with the angle α and the thickness t1 of the reflection plate 300. Preferably, the first reflection face 332 is extended with a length substantially identical to a width of a non-display region of the LCD device generated in accordance with the light source 200 having the form of the dot light source including the light emitting diodes. Hence, the backlight assembly has a reduced size according to the first reflection face 332 having a limited length. Here, the light emitting diodes generate the light by a limited angle. Therefore, a dark region of the LCD device may be formed at a portion between the light incident face 310 and the first reflection face 332 corresponding to a position of the light emitting diodes so that the portion including the dark region may not be utilized as a display region of the LCD device. In this embodiment, the extended length d3 of the first reflection face 332 is substantially corresponding to the non-display region so that the image of the LCD device may not be affected by the extension of the first reflection face 332.

In one embodiment of the present invention, a reflection pattern (not shown) is formed on the second reflection face 334 to improve a brightness uniformity of the light emitted from the light exiting face 320. The reflection pattern scatters the light incident onto the second reflection face 334 toward the light exiting face 320. Additionally, the reflection pattern controls an amount of the light emitted from the light exiting face 320 to thereby improve the brightness uniformity of the light.

As the first reflection face 332 is inclined relative to the light incident face 310 by the predetermined angle α, the distance d1 between the light exiting face 320 and the second reflection face 334 is substantially smaller than the height h of the light incident face 310. Thus, a space is provided under the light guiding plate 300. The height of the space is substantially identical to the distance d2 between the second end portion 310b of the light incident face 310 and the second reflection face 334. As a result, the reflection plate 500 is inserted into the space, thereby reducing the entire thickness t2 of the backlight assembly 1000.

Figure 6:
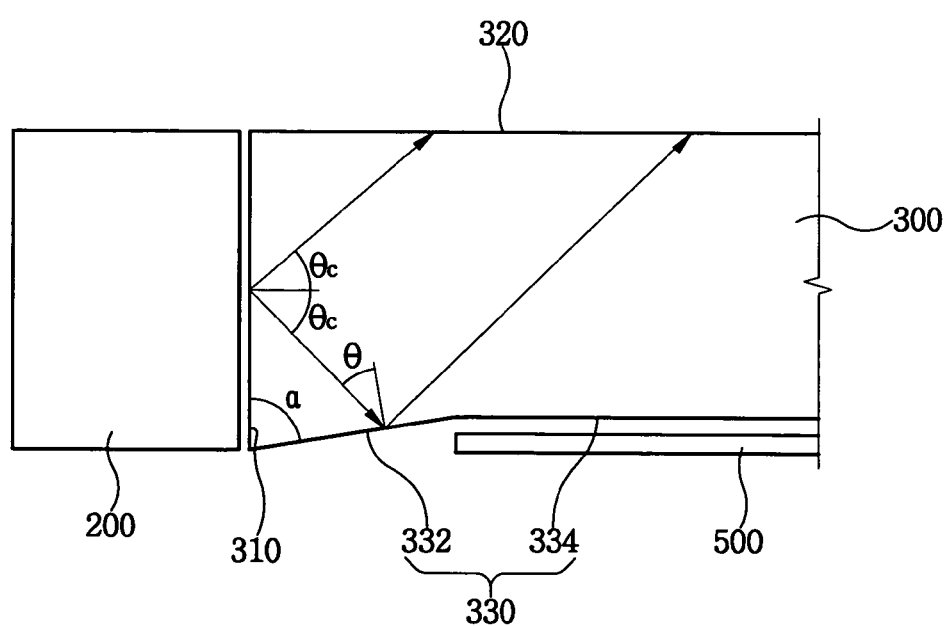
FIG. 6 is an enlarged cross-sectional view illustrating the light guiding plate in FIG. 4.

FIG. 6 is an enlarged cross-sectional view illustrating the light guiding plate in FIG. 4.

Referring to FIGS. 4 and 6, the light generated from the light source 200 is incident into the light incident face 310 by an angle of about 0 to about 180°. Here, the light passing the light incident face 310 advances into the light guide plate 300 within a critical incident angle θc. The critical incident angle θc indicates a maximum incident angle of the light that advances into the light guide plate 300 centering around a line substantially perpendicular to the light incident face 310 after the light passes the light incident face 310. The critical angle θc is obtained in accordance with the following equation (1):

$$n_1 \cdot \sin \theta_1 = n_2 \cdot \sin \theta_2 \quad (1)$$

wherein $n_1$ indicates a refractive index of a first medium before the light is incident thereto, and $n_2$ represents a refractive index of a second medium after the light is incident therein. In addition, $\theta_1$ represents an angle between the incident light and a line substantially perpendicular to the light incident face, and $\theta_2$ indicates an angle between the line substantially perpendicular to the light incident face and the light exiting the light exiting face.

When the light generated from the light source 200 is incident into the light incident face 310 by varying a first angel $\theta_1$ from about 0 to about 90° with respect to a normal line in accordance with the above equation (1), a second angle $\theta_2$ of the light incident into the light guide plate 300 is obtained. A maximum value of the obtained second angle $\theta_2$ corresponds to the critical angel $\theta c$. That is, when $n_1$ represents a refractive index of a material disposed between the light source and the light guide plate, and $n_2$ represents a refractive index of a material of the light guide plate, the critical angle $\theta c$ may be represented as the following equation (2).

$$\theta c = \sin^{-1}(n_1/n_2) \quad (2)$$

Thus, the light generated from the light source 200 passes the light incident face 310, and then is incident into the light guiding plate 300 within the critical angle $\theta c$.

In the light guiding plate 300, the light advances toward the light exiting face 320 and the reflection face 330. When the light reaches the light exiting face 320 and the reflection face 330, the light meeting a total reflection condition is reflected into the light guiding plate 300, whereas the light out of the total reflection condition is emitted from the light guiding plate 300.

Particularly, the light advances from the light source 200 into the light guiding plate 300 after passing through the light incident face 310, and then reaches the light exiting face 320 and the reflection face 330 within the critical angle $\theta c$. Among the light reaching the first reflection face 332, the light incident into the first reflection face 322 is reflected into the light guiding plate 300 when the light is incident into the first reflection face 332 by an angle larger than the critical angle $\theta c$ respect to a line substantially perpendicular to the first reflection face 332. On the other hand, the light exists from the light guiding plate 300 when the light is incident into the first reflection face 332 by an angle smaller than the critical angle $\theta c$. Hence, when the first reflection face 332 is disposed with an angle respect to the light incident face 310 in which all the light incident into the first reflection face 332 meets the total reflection condition, the space is provided under the light guiding plate 300 without any reduction of the light efficiency of the light guiding plate 300. A minimum value of the angle $\alpha$ between the light incident face 310 and the first reflection face 332 is obtained using a triangle of the light incident into light incident face 310 and the light reflecting face 332 within the critical angle $\theta c$ in accordance with the following equation (3).

$$(90-\theta c)+(90-\theta)+\alpha=180 \quad (3)$$

Thus, angle $\theta$ satisfies the following condition $\theta = \alpha - \theta c$. Then, when the angle $\theta$ is no less than the critical angle $\theta c$, a light that arrives at the first reflecting face 332 is totally reflected. Therefore, in order to prevent a leakage of a light, the following equation (4) should be satisfied.

$$\alpha \geq 2\theta c = 2\sin^{-1}(n_1/n_2) \quad (4)$$

According to the above equation (4), $\alpha$ corresponds to $2\theta c$ or $2\sin^{-1}(n_1/n_2)$. That is, the minimum value of the angle $\alpha$ between the light incident face 310 and the first reflection face 332 is about $2\theta c$ under the total reflection condition in which the light may not be leaked from the first reflection face 332.

The minimum value of the angle $\alpha$ between the light incident face 310 and the first reflection face 332 may vary in accordance with a refractive index of the light guide plate 300. For example, when the light guide plate 300 includes a polymethylmethacrylate (PMMA) plate of acryl resin, the angle $\alpha$ and the critical angle $\theta c$ may be obtained as follows.

The PMMA plate has a refractive index of about 1.49. In the above equation (2), when 1 corresponding to a refractive index of an air is substituted as $n_1$, and 1.49 corresponding to the refractive index of the PMMA plate is substituted as $n_2$, about 42.16° is obtained as the critical angle $\theta c$ of the PMMA plate. In the above equation (4), when the critical angle $\theta c$ is about 42.16°, the minimum value of the angle $\alpha$ between the light incident face 310 and the first reflection face 332 is about 84.32°. Therefore, when the first reflection face 332 is extended from the second end portion 310b and is inclined relative to the light incident face 310 with an angle of about 5.68°, a leakage of the light from the first reflection face 332 is prevented and the space is also provided under the light guide plate 300.

Figure 7:
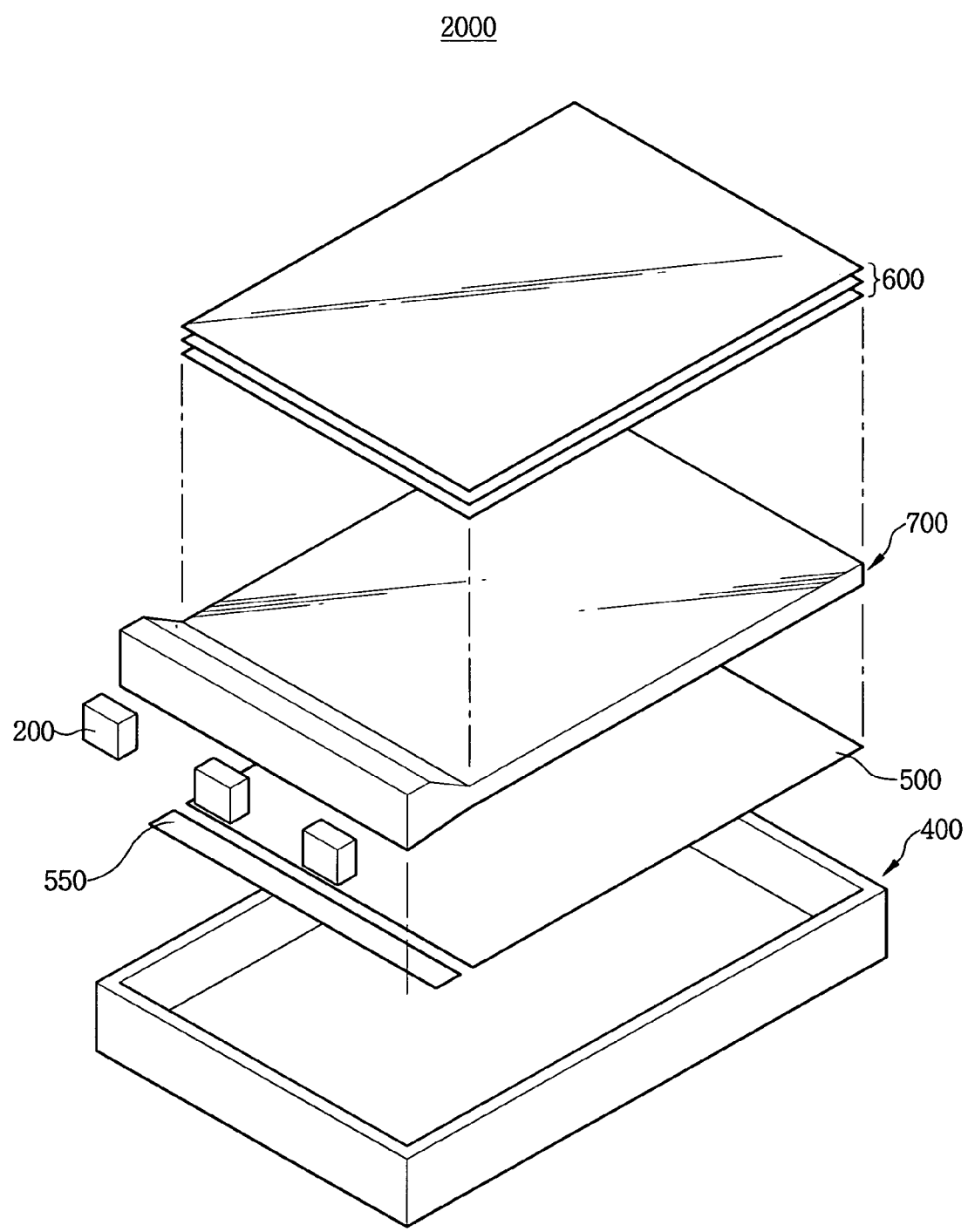
FIG. 7 is an exploded perspective view illustrating a backlight assembly according to one embodiment of the present invention.
Figure 8:
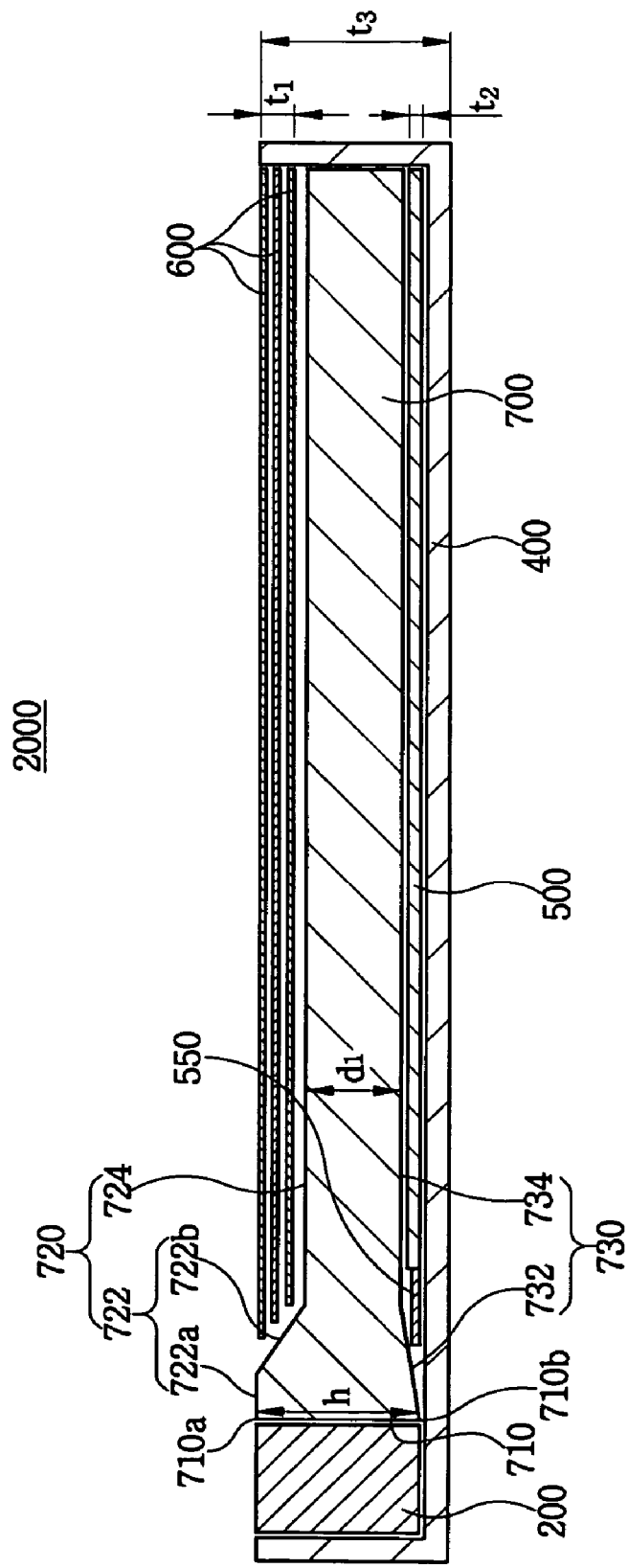
FIG. 8 is a cross-sectional view illustrating the backlight assembly in FIG. 7.

FIG. 7 is an exploded perspective view illustrating a backlight assembly according to one embodiment of the present invention, and FIG. 8 is a cross-sectional view illustrating the backlight assembly in FIG. 7. In this embodiment, the backlight assembly is substantially identical to the backlight assembly illustrated in FIG. 2 except for a light guide plate and a light absorption member.

Referring to FIGS. 7 and 8, the backlight assembly 2000 of this embodiment includes a light source 200 for generating a light, a light guide plate 700 for guiding the light generated from the light source 200 in a predetermined direction, and a receiving container for receiving the light source 200 and the light guide plate 700.

The light guide plate 700 includes a light incident face 710, a light exiting face 720 and a reflection face 730. The light generated from the light source 200 is incident into the light incident face 710. The light exiting face 720 is horizontally extended from a first end portion 710a of the light incident face 710. The reflection face 730 is extended from a second end portion 710b of the light incident face 710. The reflection face 730 is partially inclined relative to the light incident face 710.

Particularly, the light exiting face 720 includes a guiding portion 722 and a first light exiting face 724. The guiding portion 722 is extended from the first portion of the light incident face 710, and the first light exiting face 724 is extended from the guiding portion 722 in a horizontal direction relative to the light incident face 710.

The guiding portion 722 includes a second light exiting face 722a and a third light exiting face 722b. The second light exiting face 722a is horizontally extended from the first end portion 710a of the light incident face 710. The third light exiting face 722b is disposed between the second light exiting face 722a and the first light exiting face 724. The third light exiting face 722b is inclined relative to the second light exiting face 722a. Here, the third light exiting face 722b is inclined toward the reflection face 730. An angle between the second light exiting face 722a and the third light exiting face 722b is in a range of about 90 to about 180°.

The reflection face 730 includes a first reflection face 732 and a second reflection face 734. The first reflection face 732 is inclined relative to the second end portion 710b of the light incident face 710 by a predetermined angle. The second reflection face 734 is horizontally extended relative to the light incident face 710. The first reflection face 732 is extended from the second end portion 710b of the light incident face 710 and is inclined toward the light exiting face 720. Here, an angle between the light incident face 710 and the first reflection face 732 is in a range of about 0 to about 90°. Alternatively, a reflective pattern (not shown) may be formed on the second reflection face 734 to improve a brightness of the light passing toward the light exiting face 720.

A height h of the light incident face 710, which is a thickness of the light incident face 710 or a distance between the first end portion 710a and the second end portion 710b, is larger than a distance d1 between the first light exiting face 724 and the second reflection face 734. The height h of the light incident face 710 is determined in accordance with a size of the light source 200. When the height h of the light incident face 710 is substantially identical to the size of the light source 200, the efficiency of the light generated from the light source 200 may be improved.

The backlight assembly 2000 further includes a plurality of optical sheets 600, a reflection plate 500, and a light absorption member 550. The optical sheets 500 are disposed adjacent to the light exiting face 720 of the light guiding plate 700, whereas the reflection plate 500 and the light absorption member 550 are disposed adjacent to the reflection face 730 of the light guide plate 700.

The optical sheets 600 includes at least one light diffusing sheet for diffusing the light passing the light guide plate 700, and at least one light collecting sheet for collecting the light advancing toward the light guide plate 700. Hence, the optical sheets 600 improve the brightness of the light and a viewing angle of an image displayed by the LCD device. An entire thickness t1 of the optical sheets 600 is substantially equal to or less than a difference between the second light exiting face 722a and the first light exiting face 724.

The reflection plate 500 is disposed between the second reflection face 734 of the light guide plate 700 and the receiving container 400 so that the reflection plate 500 reflects the light leaked from the second reflection face 734 toward the light guide plate 700. The reflection plate 500 has a thickness t2 substantially equal to or smaller than a difference between the second end portion 710b of the light incident face 710 and the second reflection face 734.

The light absorption member 550 is disposed between the reflection face 730 and the receiving container 400. Here, the light absorption member 550 is adjacent to the light incident face 710. Preferably, the light absorption member 550 corresponds to a region of the reflection face 730 where a light reflected from the third reflection face 722b reaches after the light passes the light incident face 710. The light absorption member 550 includes a black light absorption plate of predetermined dimensions to prevent a reflection of the light reaching to the reflection plate 730. The light absorption member 550 prevents the reflection of the light so that the light may not be leaked from the light incident face 710 of the light guiding plate 700. Alternatively, the light absorption member 550 includes a black tape or a black printed plate.

In the backlight assembly 2000 of this embodiment, a space is provided between the second light exiting face 722a and the first light exiting face 724 so that the optical sheets 600 are disposed in the space. Further, an additional space is formed between the second end portion 710b of the light incident face 710 and the second reflection face 734 to thereby install the reflection plate 500 and the light absorption member 550 in the additional space. Therefore, an entire thickness t3 of the backlight assembly 2000 is reduced by the thickness t1 of the optical sheets 600 and the thickness t2 of the reflection plate 500.

Figure 9:
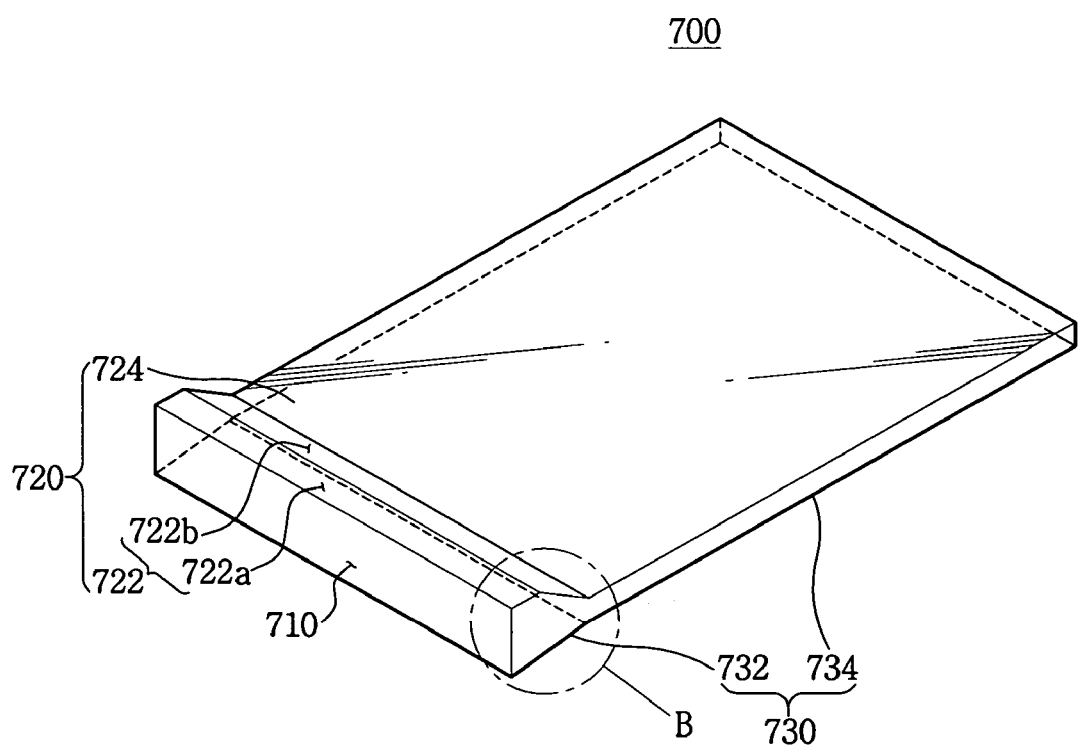
FIG. 9 is a perspective view illustrating the light guiding plate in FIG. 7.
Figure 10:
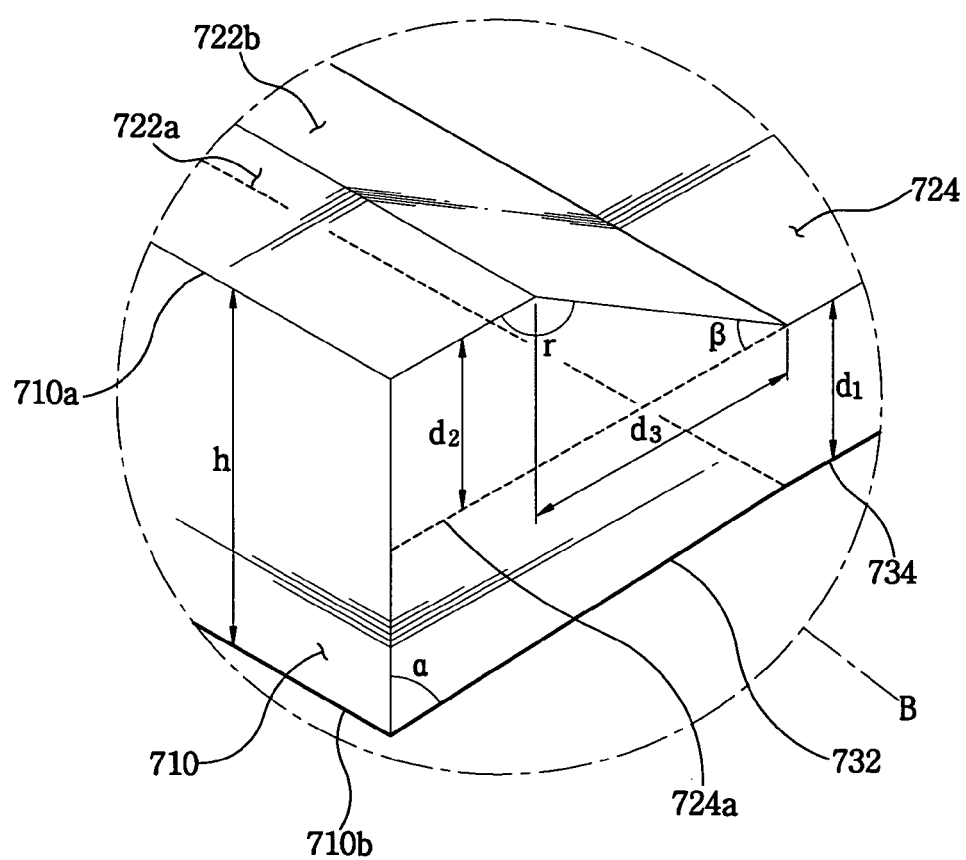
FIG. 10 is an enlarged perspective view illustrating a portion 'B' in FIG. 9.

FIG. 9 is a perspective view illustrating the light guide plate in FIG. 7, and FIG. 10 is an enlarged perspective view illustrating a portion 'B' in FIG. 9.

Referring to FIGS. 9 and 10, the light guide plate 700 includes the light incident face 710 having a predetermined height h, the light exiting face 720, and the reflection face 730. The light generated from the light source 200 is incident through the light incident face 710. The light exiting face 720 is extended from the first end portion 710a of the light incident face 710, whereas the reflection face 730 is extended from the second end portion 710b of the light incident face 710.

The reflection face 730 includes the first reflection face 732 and the second reflection face 734. The first reflection face 732 is extended from the first end portion 710a of the light incident face 710 by a predetermined angle α, whereas the second reflection face 734 is extended from the first reflection face 732 in a horizontal direction relative to the light incident face 710. The reflection face 730 of this embodiment is substantially identical to that described with reference to FIGS. 4 and 6.

The light exiting face 720 includes the guiding portion 722 and the first light exiting face 724. The guiding portion 722 is extended from the first end portion 710a of the light incident face 710, and the first light exiting face 724 is extended from the guiding portion 722 in a horizontal direction relative to the light incident face 710. In addition, the guiding portion 722 includes the second light exiting face 722a and the third light exiting face 722b. The second light exiting face 722a is extended from the first end portion 701a of the light incident face 710 in the horizontal direction relative to the light incident face 710. The third light exiting face 722b is extended from the second light exiting face 722b by the predetermined angle.

Particularly, the third light exiting face 722b is extended from the second light exiting face 722a to the first light exiting face 724 by a predetermined angle. Here, the third light exiting face 722b is inclined toward the reflection face 730. An angle β between the third light exiting face 722b and the first light exiting face 724 is an angle β between the third light exiting face 722b and a line 724a horizontally extended from the first light exiting face 724, and is in a range of about 0 to about 90°. Meanwhile, an angle γ between the first light exiting face 722a and the third light exiting face 722b is in a range of about 90 to about 180°. Here, the angle β between the third light exiting face 722b and the line 724a horizontally extended from the first light exiting face 724 depends on a length d3 of the third light exiting face 722b as well as a height d2 of the third light exiting face 722b. The height d2 of the third light exiting face 722b is substantially equal to or less than the entire thickness t1 of the optical sheets 600.

Since the light guide plate 700 includes the third light exiting face 722b, a direction of the light passing the light incident face 710 may be altered in the light guide plate 700.

Figure 11:
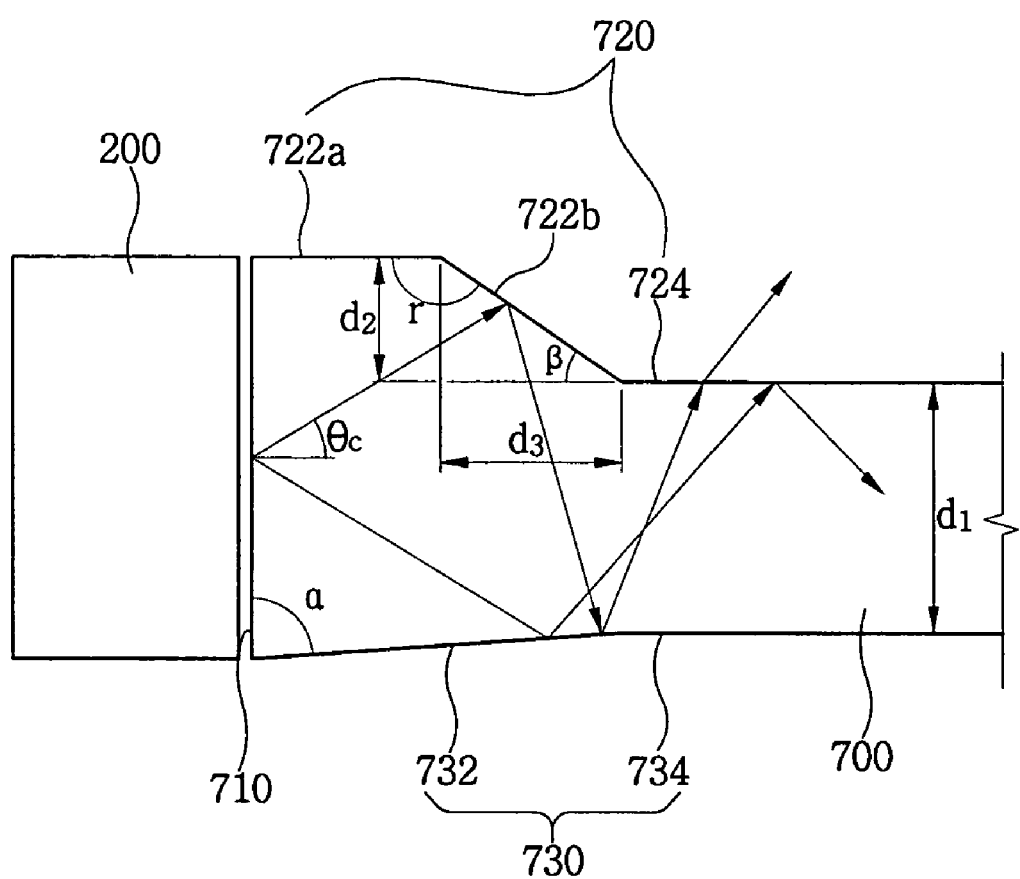
FIG. 11 is a schematic cross-sectional view illustrating the light guiding plate in FIG. 9.

FIG. 11 is a schematic cross-sectional view illustrating the light guide plate in FIG. 9.

Referring to FIGS. 9 and 11, the light generated from the light source 200 is incident into the light incident face 710 by an angle of about 0 to about 90° with respect to the normal line. The light is incident into the light guide plate 700 through the light incident face 710 within the critical angle θc described in the above equation (1). For example, when the light guide plate 700 includes the PMMA plate, the critical angle θc of the PMMA plate is about 42.16°. In addition, the height d2 of the third light exiting face 722b is about 0.2 mm and the length d3 of the third light exiting face 722b is about 0.5 mm. Here, the angle β between the third light exiting face 722b and the line 724a of the first light exiting face 724 is about 21.8°. Thus, the light generated from the light source 200 is incident into the light guide plate 700 through the light incident face 710 within an angle of about ±42.16° centering around the vertical line relative to the light incident face 710.

After the light passes the light guide plate 700, the light reaches the light exiting face 720 and the reflection face 730. Here, when the light meets the total reflection condition, the light is reflected into the light guide plate 700. On the other hand, when the light does not meet the total reflection condition, the light exits from the light guide plate 700. Namely, when the light is incident into the light guide plate 700 by an angle of above about 42.16°, the light is reflected into the light guide plate 700. However, when the light is incident into the light guide plate 700 by an angle of below about 42.16°, the light exits from the light guide plate 700. In particular, when the light is incident into the light guide plate 700 by an angle of about 0 to about 42.16° centering around the vertical line relative to the light incident face 710, the light reaches the first to the third light exiting faces 724, 722a and 722b. Since the light reaches the first and the second light exiting faces 724 and 722a by an angle of above about 47.84° centering around vertical lines relative to the first and the second light exiting faces 724 and 722a, the light meets the total reflection condition so that the light is totally reflected into the light guide plate 700.

One portion of the light reached to the third light exiting face 722b is reflected, whereas another portion of the light reached to the third light exiting face 722b is emitted from the third light exiting face 722b. Particularly, because the angle between the third light exiting face 722b and the line 724a of the first light exiting face 724 is about 21.8°, the light is incident into the third light exiting face 722b by an angle of above about 26.04° centering around the vertical line relative to the third light exiting face 722b. Thus, one portion of the light incident into the third light exiting face 722b by an angle of about 26.04° to about 42.16° is emitted from the third light exiting face 722b, whereas another portion of the light incident into the third light exiting face 722b by an angle of above about 42.16° is reflected toward the reflection face 730. The light reflected from the third light exiting face 722b reaches the reflection face 730 by an angle of above about 20.36° centering around a line substantially perpendicular to the reflection face 730. The light incident into the reflection face 730 by an angle of about 20.36 to about 42.16° is emitted through the reflection face 730. The light emitted through the reflection face 730 is repeatedly reflected from the reflection plate 500 into the light guide plate 700, thereby causing the leakage of the light around the light exiting face 720. Because the backlight assembly 2000 of this embodiment includes the light adsorption member 550 corresponding to a region of the reflection face 730 where the light reflected from the third light exiting face 722b reaches, the light adsorption member 550 may effectively prevent the leakage of the light around the light existing face 720.

After the light incident into the light guide plate 700 by an angle of about 0 to about −42.16° centering around a line perpendicular to the light incident face 710, the light reaches the first and second reflection faces 732 and 734 of the light guide plate 700. Because the light reached to the first and second reflection faces 732 and 734 meets the total reflection condition as described above, the light is entirely reflected toward the light existing face 720.

As for the light guide plate 700, a position where the first reflection face 732 meets the second reflection face 734 preferably corresponds to a position where the guiding portion 722 is connected to the first reflection face 724. The guiding portion 722 preferably has an extended length corresponding to the non-display region of the LCD device because the light source 200 is a dot shape light source. When the guiding portion 722 and the first reflection face 724 correspond to the non-display region of the LCD device, an entire thickness of the backlight assembly 2000 may be reduced without increasing dimensions of the backlight assembly 2000.

Figure 12:
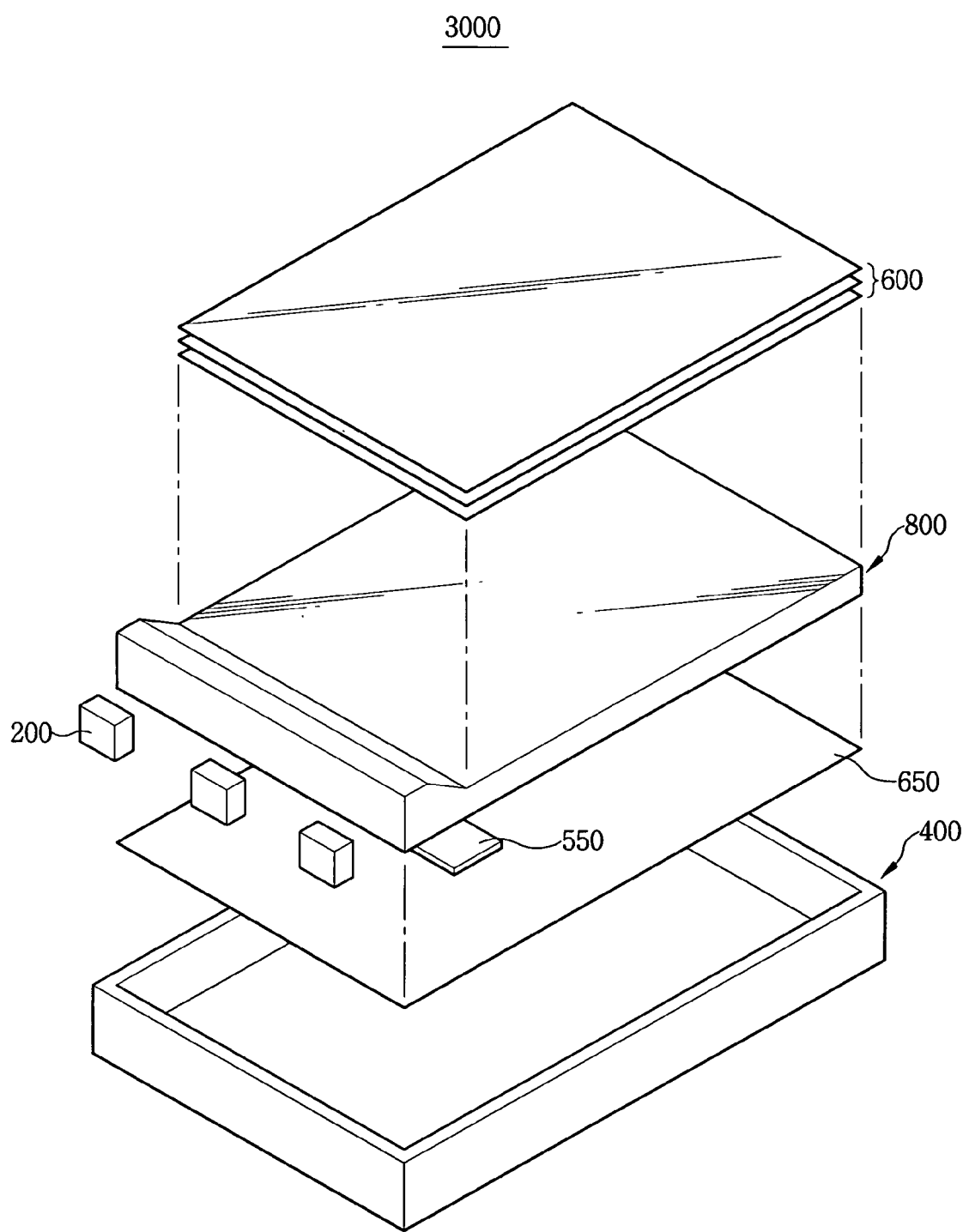
FIG. 12 is an exploded perspective view illustrating a backlight assembly according to one embodiment of the present invention.
Figure 13:
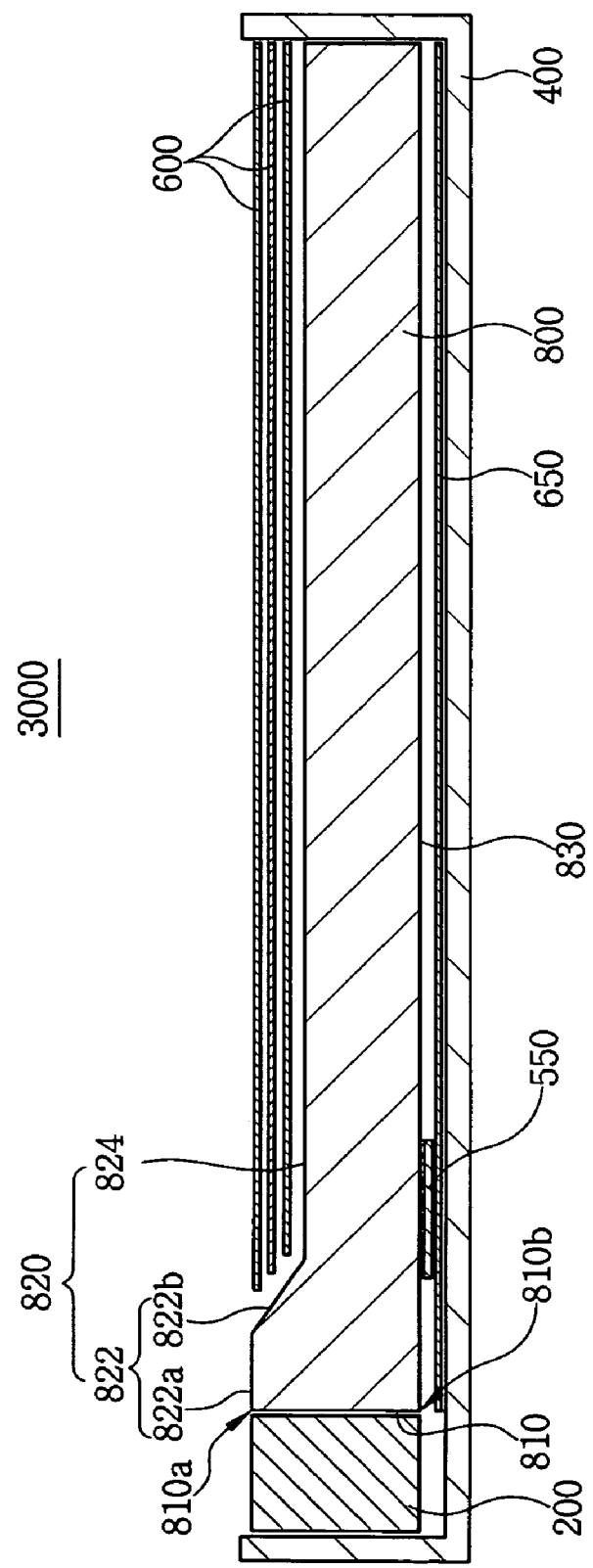
FIG. 13 is a cross-sectional view illustrating the backlight assembly in FIG. 12.

FIG. 12 is an exploded perspective view illustrating a backlight assembly according to one embodiment of the present invention, and FIG. 13 is a cross-sectional view illustrating the backlight assembly in FIG. 12. In this embodiment, the backlight assembly has a construction substantially identical to that of the backlight assembly described with reference to FIG. 7 except for a light guide plate, a light adsorption member and a reflection plate.

Referring to FIGS. 12 and 13, the backlight assembly 3000 of this embodiment includes a light source 200 for generating a light, a light guide plate 800 for guiding the light generated from the light source 200 in a predetermined direction, a receiving container 400 for receiving the light source 200 and the light guide plate 800 therein, and a light adsorption member 550 disposed between the light guide plate 800 and the receiving container 400.

The light guide plate 800 includes a light incident face 810 where the light generated from the light source 200 is incident, a light exiting face 820, and a reflection face 830. The light exiting face 820 includes a guiding portion 822 extended from a first end portion 810a of the light incident face 810, and a first light exiting face 824 horizontally extended from the guiding portion 822. The reflection face 830 is extended from a second end portion 810b of the light incident face 810.

The guiding portion 822 includes a second light exiting face 822a extended from the first end portion 810a of the light incident face 810, and a third light exiting face 822a extended from the second light exiting face 822a by a predetermined angle. That is, the inclined third light exiting face 822b is positioned between the second light exiting face 822a and the first light exiting face 824. Here, the third light exiting face 822b is inclined toward the reflection face 830. An angle between the second light exiting face 822a and the third light exiting face 822b is in a range of about 90 to about 180°. The light exiting face 820 has a structure substantially identical to that of the light exiting face 720 in FIG. 8. Thus, detailed description of the light exiting face 820 will be omitted.

The reflection face 830 is extended from the second end portion 810b of the light incident face 810 in a direction substantially perpendicular to the light incident face 810. The light adsorption member 550 and the reflection plate 650 are disposed under the reflection face 830.

The light adsorption member 550 is interposed between the light guide plate 800 and the reflection plate 650. Preferably, the light adsorption member 550 and the reflection plate 650 are integrally formed. The light adsorption member 550 includes a black material to prevent a reflection of the light therefrom. For example, the light adsorption member 550 has a plate attached to the reflection plate 650. A position of the light adsorption member 550 is determined in accordance with a shape of the third light exiting face 822b of the light guide plate 800. Particularly, after the light generated from the light source 200 is incident into the light incident face 810, a portion of the light reflected from the third light exiting face 822b reaches the reflection face 830. Here, the light adsorption member 550 corresponds to a region of the reflection face 830 where the portion of the light reaches by an angle less than the critical angle θc centering around a line perpendicular to the reflection face 830. That is, the light adsorption member 550 absorbs the light passing the reflection face 830 after the light is reflected from the third light exiting face 822b, thereby preventing a leakage of the light around the light incident face 810 of the light guide plate 800.

Alternatively, the light adsorption member 550 includes a black tape attached to the reflection face 830 of the light guide plate 800 or the reflection plate 650. In addition, the light adsorption member 550 is formed by printing a black material on the reflection plate 650 or the reflection face 830 of the light guide plate 800. Further, any other material for adsorbing a light may be used to form the light adsorption member 550.

A light adsorption rate of the light adsorption member 550 may be varied to adjust an amount of the light leaked around the light incident face 810 of the light guide plate 800. Hence, the light emitted through the light exiting face 820 of the light guide plate 800 may have enhanced brightness and uniformity.

Figure 14:
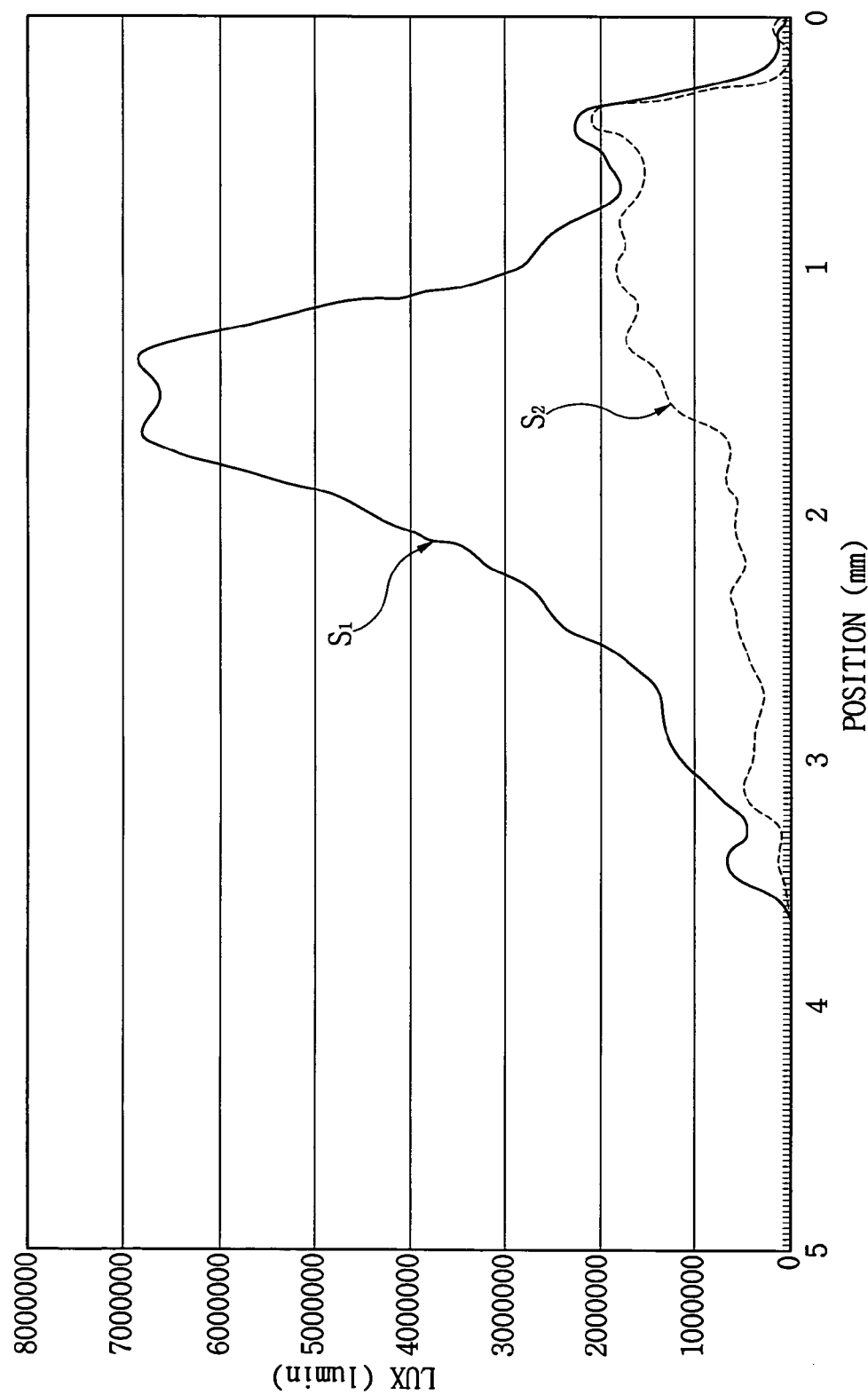
FIG. 14 is a graph illustrating a bright distribution of a light emitted through a light guiding plate in FIG. 12.

FIG. 14 is a graph illustrating a bright distribution of a light emitted through a light guide plate in FIG. 12. FIG. 14 shows a bright distribution S1 of a light without the light adsorption member 550 and a bright distribution S2 of a light with the light adsorption member 550. Here, the third light exiting face 822b of the light guide plate 800 has a height d2 of about 0.2 mm and a length d3 of about 0.5 mm. In FIG. 14, an X-axis indicates a position of the light emitted through the third light exiting face 822b from a point where the second light exiting face 822a meets the third light exiting face 822b to the first light exiting face 824, whereas a Y-axis represents the brightness of the light emitted through the third light exiting face 822b.

Referring to FIG. 14, when the light adsorption member 550 is not formed, a maximum brightness distribution S1 of the light, that is emitted through a portion of the third light exiting face 822b separated from the second light exiting face 822a by a distance of about 1 to about 2 mm, is about $7 \cdot 10^6$ lumin. Other brightness distribution S1 of the light that is emitted through other portions of the third light exiting face 822b is relatively low because the light reflected from the third light exiting face 822b is leaked through the light incident face 820.

When the light adsorption member 550 is formed, the bright distribution S2 of the light indicates that the leakage of the light is slightly generated near a portion of the third light exiting face 822b separated from the second light exiting face 822a by a distance of about 0.5 mm, whereas the leakage of the light may not be generated at other portions of the third light exiting face 822b. The leakage of the light generated at the portion of the third light exiting face 822b separated from the second light exiting face 822a by a distance of about 0.5 mm is caused by a direct emission of the light through the third light exiting face 822b after the light is incident into the light incident face 810. The leakage of the light may not be generated at other portions of the third light exiting face 822b since the light is reflected from the third light exiting face 822b. Therefore, the light adsorption member 550 may effectively prevent the leakage of the light around the light incident face 810 of the light guide plate 800.

Figure 15:
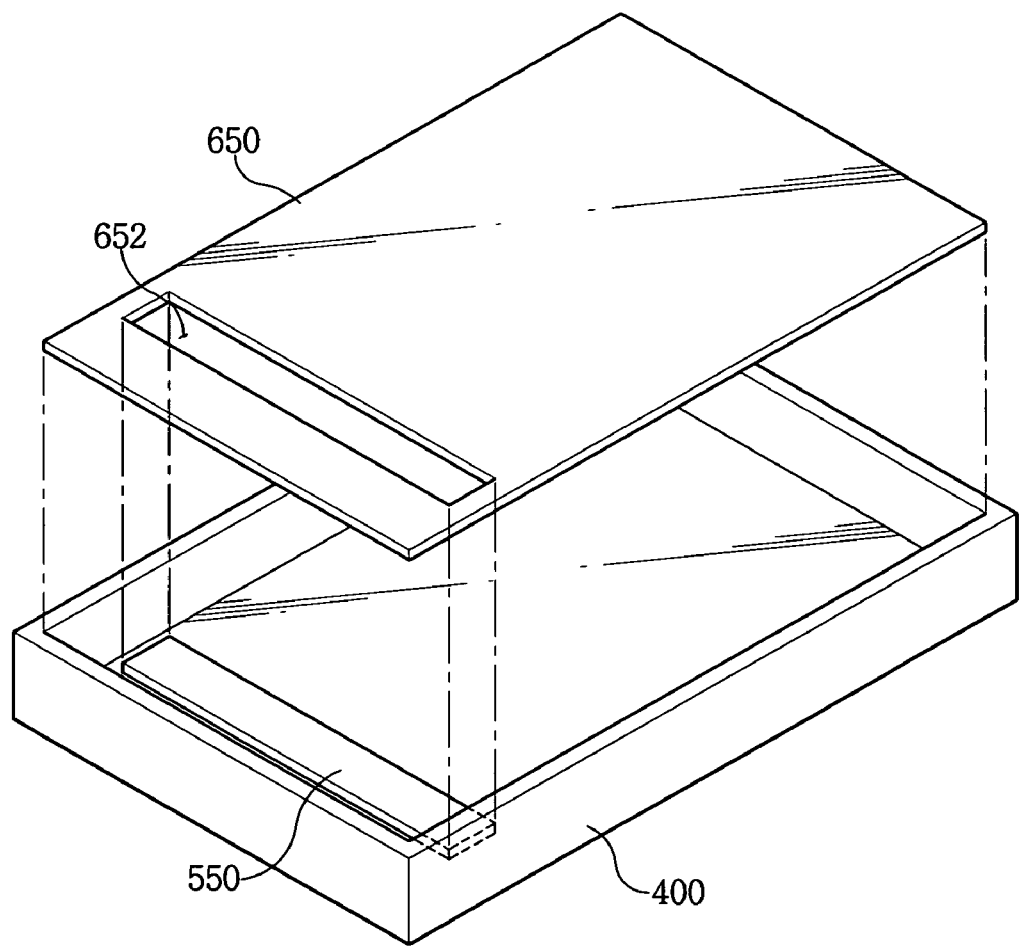
FIG. 15 is an exploded perspective view illustrating a reflection plate according to one embodiment of the present invention.

FIG. 15 is an exploded perspective view illustrating a reflection plate according to one embodiment of the present invention.

Referring to FIG. 15, a reflection plate 650 includes a light adsorption member 550 formed on a bottom face of a receiving container 400. The reflection plate 650 includes an opening 652 corresponding to the light adsorption member 550.

The light adsorption member 550 includes a black material to prevent a light from reflecting thereof. For example, the light adsorption member 550 includes a black plate or a black tape. The light adsorption member 550 is attached to or printed on the bottom face of the receiving container 400. Since the reflection plate 650 is mounted on the light adsorption member 550 formed on the bottom face of the receiving container 400, the light adsorption member 550 may not directly contact a light guide plate 800 installed on the reflection plate 650. The light adsorption member 550 prevents a leakage of the light around a light incident face of the light guide plate 800 because the light adsorption member 550 does not directly contact a reflection face 830 of the light guide plate 800. Additionally, since the light adsorption member 550 does not directly contact the reflection face 830 of the light guide plate 800, the light reflected into the light guide plate 800 may not be adsorbed by the light adsorption member 550, thereby preventing a brightness of the light from decreasing.

Liquid Crystal Display Device

Figure 16:
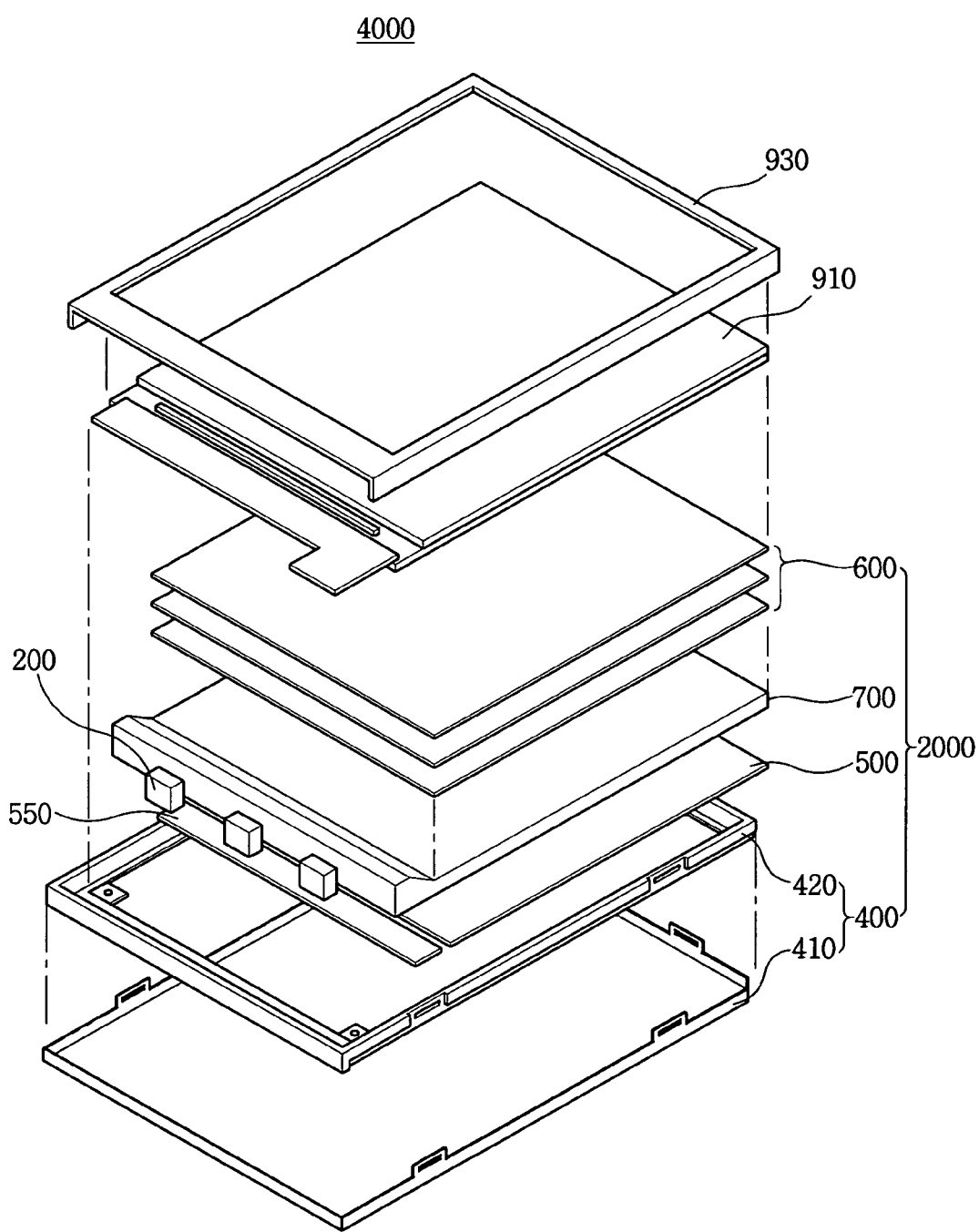
FIG. 16 is an exploded perspective view illustrating an LCD device according to one embodiment of the present invention.
Figure 17:
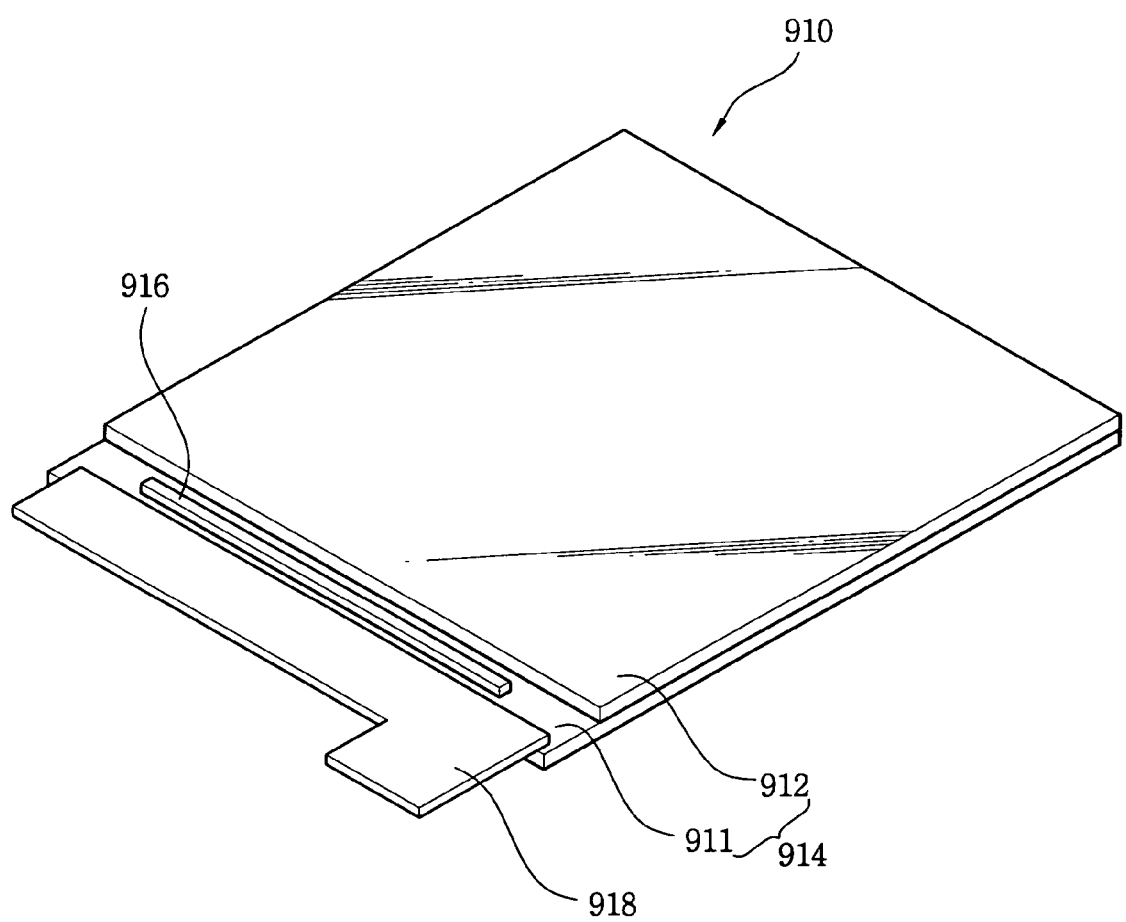
FIG. 17 is an enlarged perspective view illustrating a display unit in FIG. 16.

FIG. 16 is an exploded perspective view illustrating an LCD device according to one embodiment of the present invention, and FIG. 17 is an enlarged perspective view illustrating a display unit in FIG. 16.

Referring to FIGS. 16 and 17, an LCD device 4000 of this embodiment includes a backlight assembly 2000 for providing a light, a display unit 910 for displaying an image using the light provided from the backlight assembly 2000, and a top chassis 930 for fixing the display unit 910 on the backlight assembly 2000.

The backlight assembly 2000 has a construction substantially identical to that of the backlight assembly described with reference to FIGS. 7 to 11. Thus, a description of the backlight assembly 2000 may be omitted. However, a receiving container 400 of the backlight assembly 2000 may include one container or two containers. That is, the receiving container 400 includes a bottom chassis 410 and a mold frame 420. The mold frame 420 includes four sidewalls to precisely receive a light source 200 and a light guising plate 700. The mold frame 420 also includes an opened bottom. The bottom chassis 410 includes a bottom face and four sidewalls extended from the bottom face. For example, the bottom chassis 410 is combined with the mold frame 420 by a hook.

A reflection plate 500, a light adsorption member 550, the light source 200, the light guide plate 700 and a plurality of optical sheets 600 are subsequently installed in the receiving container 400.

The display unit 910 is mounted on the backlight assembly 2000 so as to display the image using the light generated from the backlight assembly 2000. The display unit 910 includes a liquid crystal display panel 914, a driving chip 916 and a ductile circuit 918.

The liquid crystal display panel 914 includes a first substrate 911, a second substrate 912 corresponding to the first substrate 911, and a liquid crystal layer (not shown) interposed between the first substrate 911 and the second substrate 912.

The first substrate 911 includes a plurality of pixels arranged as a matrix type. Each of the pixels includes a gate line extended in a first direction, a data line extended in a second direction substantially perpendicular to the first direction, and a pixel electrode. The data line is insulated from the gate line. Each of the pixels further includes a thin film transistor (TFT, not shown) that is electrically connected to the gate line, the data line and the pixel electrode.

The second substrate 912 includes red (R), green (G) and blue (B) pixels formed by a thin film formation process, and a common electrode corresponding to the R G B pixels. The arrangement of the liquid crystal display layer varies in accordance with an electric field generated between the pixel electrode and the common electrode, thereby adjusting a permeability of the light provided from the backlight assembly 2000.

The driving chip 916 is mounted on the first substrate 911 for applying driving signals to the data line and the gate line. The driving chip 916 is mounted on the first substrate 911 by a chip on glass (COG) process. Two driving chips 916 may be mounted on the first substrate 911 for the data line and the gate line, respectively. Alternatively, one integrated driving chip 916 may be mounted for the data and gate lines.

The ductile circuit 918 is attached to the first substrate 911 adjacent to the driving chip 916 so as to apply a control signal for controlling the driving chip 916. The ductile circuit 918 includes a timing controller for controlling a driving signal or a memory for storing a data signal. The ductile circuit 918 is electrically connected to the first substrate 911 using an anisotropic conductive film.

According to the backlight assembly of the present invention, a light guide plate of the backlight assembly includes a reflection face and a light exiting face. The reflection face of the light guide plate includes a first reflection face inclined by a predetermined angle, and the light exiting face includes a third light exiting face inclined by a predetermined angle. A reflection plate and a plurality of optical sheets are disposed in spaces provided by the inclined first reflection face and the third light exiting face, respectively. Thus, an entire thickness of the backlight assembly is reduced by a thickness of the reflection plate and a thickness of the optical sheets.

In addition, a leakage of the light incident around the third light exiting face is prevented because a light adsorption member for preventing the light from reflecting is disposed near the reflection face of the light guide plate.

The present invention has been described with reference to various exemplary embodiments thereof. The scope of the present invention must not be interpreted, however, as being restricted to these exemplary embodiments. Rather, it will be apparent to those of ordinary skill in the art that various modifications may be made to the described embodiments without departing from the spirit and scope of the invention.

What is claimed is:

1. A backlight assembly comprising:
a light source to generate a light;
a light guide plate including i) a light incident face where the light generated from the light source is incident, ii) a light exiting face extended from a first end portion of the light incident face, and iii) a reflection face extended from a second end portion of the light incident face, wherein the reflection face includes a first reflection face extended from the second end portion of the light incident face by a predetermined angle, and a second reflection face extended from the first reflection face in a direction substantially parallel to the light exiting face;
a receiving container to receive the light source and the light guide plate therein; and
a reflection plate disposed between the reflection face and the receiving container to reflect a light leaked from the reflection face;

wherein an angle between the first reflection face and the light incident face is in a range of about 0° to about 90°.

2. The backlight assembly of claim 1, wherein the angle between the first reflection face and the light incident face is greater than about $2\sin^{-1}(n_1/n_2)$ wherein $n_1$ represents a refractive index of a material disposed between the light source and the light guide plate, and the $n_2$ represents a refractive index of a material of the light guide plate.

3. The backlight assembly of claim 2, wherein the light guiding plate comprises a polymethylmethacrylate (PMMA) plate having a refractive index of about 1.49, the critical angle is about 42.16°, and the angle between the first reflection face and the light incident face is about 84.32°.

4. The backlight assembly of claim 1, wherein the reflection plate corresponds to the second reflection face.

5. The backlight assembly of claim 1, wherein the light exiting face comprises a guiding portion extended from the first end portion of the light incident face, and a first light exiting face extended from the guiding portion in a direction substantially parallel to the second reflection face.

6. The backlight assembly of claim 5, wherein the guiding portion comprises a second light exiting face extended from the first end portion of the light incident face in a direction substantially parallel to the first light exiting face, and a third light exiting face extended from the second light exiting face to the first light exiting face by a predetermined angle.

7. The backlight assembly of claim 6, wherein an angle between the second light exiting face and the third light exiting face is in a range of about 90 to about 180°.

8. The backlight assembly of claim 5, wherein a distance between the first light exiting face and the second reflection face is substantially larger than a height of the light incident face.

9. The backlight assembly of claim 7, wherein a point where the first light exiting face is connected to the third light exiting face corresponds to a point where the first reflection face is connected to the second reflection face.

10. The backlight assembly of claim 6, further comprising a light absorption member disposed adjacent to the reflection face of the light guide plate to prevent a reflection of a light leaked from the reflection face.

11. The backlight assembly of claim 10, wherein the light absorption member corresponds to a region of the reflection face where a light reflected from the third light exiting face reaches after the light passes the light incident face.

12. The backlight assembly of claim 6, further comprising at least one optical sheet disposed over the first light exiting face to improve characteristics of a light exiting the first light exiting face.

13. The backlight assembly of claim 12, wherein an entire thickness of the optical sheet is substantially equal to or less than a difference between the second light exiting face and the first light exiting face.

14. A backlight assembly comprising:
a light source to generate a light;
a light guide plate including i) a light incident face where the light generated from the light source is incident, ii) a light exiting face having a guiding portion extended from a first end portion of the light incident face, and a first light exiting face extended from the guiding portion in a direction substantially parallel to the guiding portion, and iii) a reflection face extended from a second end portion of the light incident face;
a receiving container to receive the light source and the light guide plate therein; and
a light absorption member disposed between the reflection face and the receiving container to correspond to the reflection face so that the light absorption member prevents a reflection of a light leaked from the reflection face.

15. The backlight assembly of claim 14, wherein the guiding portion comprises a second light exiting face extended from the first end portion of the light incident face in a direction substantially parallel to the light exiting face, and a third light exiting face extended from the second light exiting face to the first light exiting face by a predetermined angle.

16. The backlight assembly of claim 15, wherein an angle between the second light exiting face and the third light exiting face is in a range of about 90 to about 180°.

17. The backlight assembly of claim 15, wherein a difference between the first light exiting face and the reflection face is substantially smaller than a difference between the second light exiting face and the reflection face.

18. The backlight assembly of claim 15, further comprising at least one optical sheet disposed over the first light exiting face to improve characteristics of a light exiting the first light exiting face; and
a reflection plate between the reflection face and the receiving container to reflect a light leaked from the reflection face.

19. The backlight assembly of claim 18, wherein an entire thickness of the optical sheet is substantially equal to or less than a difference between the second light exiting face and the first light exiting face.

20. The backlight assembly of claim 19, wherein the light absorption member corresponds to a region of the reflection face where a light reflected from the third light exiting face reaches after the light passes the light incident face.

21. The backlight assembly of claim 20, wherein the light absorption member is disposed between the reflection face and the reflection plate.

22. The backlight assembly of claim 20, wherein the light absorption member is positioned on a bottom face of the receiving container, and the reflection plate includes an opening corresponding to the light absorption member.

23. The backlight assembly of claim 20, wherein the light absorption member comprises a black tape or a black printed plate.

24. A liquid crystal display device comprising:
a light source to generate a light;
a light guide plate including i) a light incident face where the light generated from the light source is incident, ii) a light exiting face having a guiding portion extended from a first end portion of the light incident face, and a first light exiting face extended from the guiding portion in a direction substantially parallel to the guiding portion, and iii) a reflection face extended from a second end portion of the light incident face;
a receiving container to receive the light source and the light guide plate therein;
a light absorption member disposed between the reflection face and the receiving container to correspond to the reflection face, wherein the light absorption member prevents a reflection of a light from the reflection face; and
a liquid crystal display panel disposed over the light exiting face to display an image using a light exiting from the light exiting face.

25. The liquid crystal display device of claim 24, wherein the guiding portion comprises a second light exiting face extended from the first end portion of the light incident face in a direction substantially parallel to the first light exiting face, and a third light exiting face extended from the second light exiting face to the first light exiting face by a predetermined angle.

26. The liquid crystal display device of claim 25, wherein a difference between the first light exiting face and the reflection face is substantially smaller than a difference between the second light exiting face and the reflection face.

27. The liquid crystal display device of claim 24, wherein the reflection face comprises a first reflection face extended from the second end portion of the light incident face by a predetermined angle, and a second reflection face extended from the first reflection face in a direction substantially parallel to the first light exiting face.

28. The liquid crystal display device of claim 27, wherein an angle between the first reflection face and the light incident face is in a range of about $2 \sin^{-1}(n_1/n_2)°$ to about 90°, wherein $n_1$ represents a refractive index of a material disposed between the light source and the light guide plate, and the $n_2$ represents a refractive index of a material of the light guide plate.

29. The liquid crystal display device of claim 25, wherein the light absorption member corresponds to a region of the reflection face where a light reflected from the third light exiting face reaches after the light passes the light incident face.

30. The liquid crystal display device of claim 26, further comprising at least one optical sheet disposed over the first light exiting face to improve characteristics of a light exiting the first light exiting face.

31. The liquid crystal display device of claim 30, wherein an entire thickness of the optical sheet is substantially equal to or less than a difference between the second light exiting face and the first light exiting face.

32. The liquid crystal display device of claim 28, further comprising a reflection plate disposed between the second reflection face and the receiving container to reflect a light leaked from the second reflection face.

33. The liquid crystal display device of claim 32, wherein a thickness of the reflection plate is substantially equal to or less than a difference between the second end portion of the light incident face and the second reflection face.

34. The liquid crystal display device of claim 32, wherein the light absorption member is disposed between the reflection face and the reflection plate.

* * * * *